W. G. SCHRÖDER.
APPARATUS FOR COOLING AND DRYING MATERIALS.
APPLICATION FILED OCT. 11, 1909.
949,719.
Patented Feb. 15, 1910.
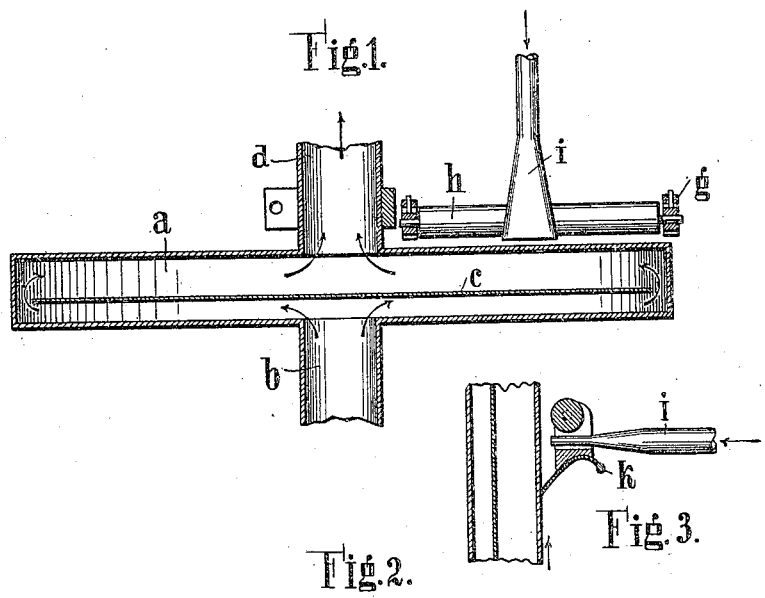
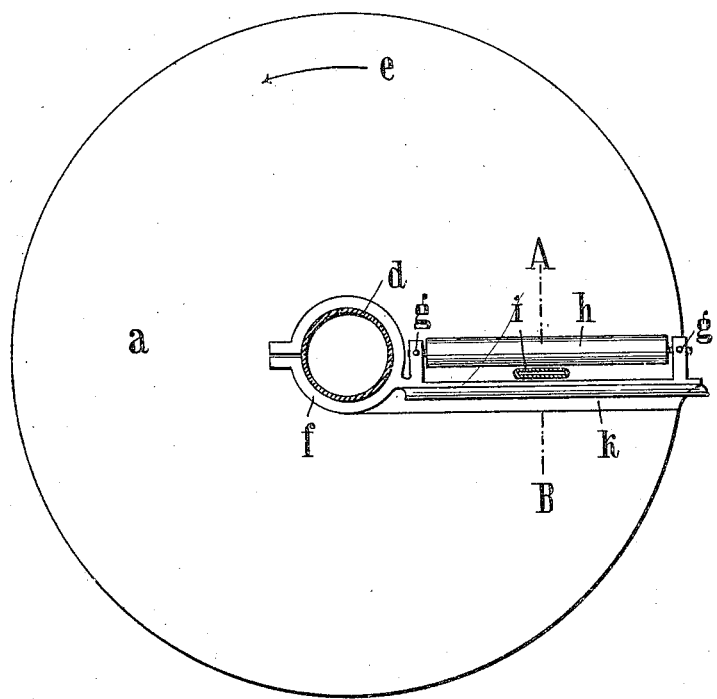

UNITED STATES PATENT OFFICE.

WILHELM G. SCHRÖDER, OF LÜBECK, GERMANY, ASSIGNOR TO ALTONAER MARGARINE WERKE MOHR & CO. GESELLSCHAFT MIT BESCHRÄNKTER HAFTUNG, OF ALTONA-OTTENSEN, GERMANY, A CORPORATION OF GERMANY.

APPARATUS FOR COOLING AND DRYING MATERIALS.

949,719.     Specification of Letters Patent.     Patented Feb. 15, 1910.

Application filed October 11, 1909. Serial No. 522,122.

*To all whom it may concern:*

Be it known that I, WILHELM G. SCHRÖDER, manufacturer, a citizen of the free town of Lübeck, in the Empire of Germany, and resident of Lübeck, Germany, have invented new and useful Apparatus for Cooling and Drying Materials, of which the following is a specification.

This invention relates to a new cooler which is more particularly intended for dairies for cooling cream, and also for the manufacture of margarin, or for consistent substances, etc. In the event of a heating medium being used in place of a cooling medium, the said cooler can be used also as an apparatus for drying various materials, such as all kinds of paste, milk, potatoes, etc.

A construction of the apparatus according to this invention as a cooler for dairy purposes and margarin manufacture, is illustrated by way of example in the accompanying drawing, in which—

Figure 1 is a vertical section, Fig. 2 a plan and Fig. 3 a section on line A—B of Fig. 2.

The new apparatus comprises a round table *a* which is hollow and always maintained cool in the interior in a suitable manner by means of a cooling medium, or, when it is question of drying apparatus is maintained warm by means of a heating medium such as for instance steam, boiling water, hot air or the like. The cooling medium is admitted into the apparatus at *b*, is distributed in the most uniform manner possible by a suitable distributing device *c* and discharged from the apparatus at *d*. The table is rotatably mounted in a suitable manner and rotates in the direction of the arrow *e* (Fig. 2). The central spindle is surrounded by a sleeve *f*, in which the spindle can rotate. The said sleeve carries suitable, vertically adjustable, bearings *g* in which is rotatably mounted a pressure and distributing roller *h*. Behind the bearings in question is arranged a supply pipe *i*, and behind the latter a scraper *k*.

When the sleeve *f* with the parts *g i k* connected to it, is standing still, and the table *a* rotates in the direction of the arrow, the material discharged from the opening *i* on to the table, is uniformly distributed over the said table by means of the roller *h*. Each portion of the material to be cooled must make nearly a complete revolution with the table, this insuring a sufficiently long time for thorough cooling. The cooled material finally comes into contact with the scraper *k* which is arranged partly tangentially relatively to the direction of rotation of the table. Owing to the said scraper being curved like a plough-share, the material is rolled up from the table into a coil, and at the same time radially scraped off from the table plate, whereupon it is received into a truck or vat arranged underneath.

Owing to the arrangement of the table with the distributing roller, supply pipe and scraper or discharge device arranged on it, the material is not only uniformly distributed and consequently remains for a uniform and comparatively long time in contact with the table, but the above mentioned coiling up of the material takes place, which is of great importance for a cooling or drying process. In the said coiling up, the layer of material which was in direct contact with the table, is brought into contact with a layer which was slightly farther away from the surface of the table, and therefore, was a little less cooled or dried, so that a thorough mixing of cooled and less cooled material in insured. This results in an equalizing action, since the material less cooled gives off heat to the material cooled very strongly, or in drying apparatus the heat of the very strongly heated layer is transmitted to the less heated layer. This action distinguishes favorably the new apparatus from well known roller apparatus in which the material is scraped off merely by a roller. In the latter case it frequently happens that the rollers take away much more heat than they are able to cool, and more particularly that there is no systematic heating of strongly cooled or dry material with the less strongly cooled or dried layers. Further, the new arrangement results in a favorable utilization of the working surface and in an easy, even entirely automatic discharge of any vapors formed.

Instead of rotating the table and keeping the sleeve with the parts connected to it stationary, the apparatus could be reversed in such manner that the rollers, scraper and supply pipe would be rotated with their bearings etc. while the table remains stationary. In some cases, simultaneous movement of both is advantageous.

Claims.

1. In an apparatus of the character described, the combination of a revoluble table provided with means whereby a cooling or heating medium may be circulated therethrough, a distributing roller, a supply pipe, and a scraper, substantially as described.

2. In an apparatus of the character described, the combination of a revoluble hollow table, having means therein for causing the circulation of a cooling or heating medium, a roller axially located in relation to said table, adjustable bearings supporting said roller, and a supply pipe and scraping knife on one side of said roller, substantially as described.

In testimony that I claim the foregoing as my invention, I have signed my name in presence of two witnesses, this twenty-ninth day of September 1909.

WILHELM G. SCHRÖDER.

Witnesses:
JOHS. WULF,
JACOB BIERFELDTS.